United States Patent
Misso et al.

(10) Patent No.: US 6,826,019 B2
(45) Date of Patent: Nov. 30, 2004

(54) ACTUATOR STOP

(75) Inventors: Nigel Frank Misso, Yukon, OK (US); Steve Scott Eckerd, Oklahoma City, OK (US); Roy L. Wood, Yukon, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 298 days.

(21) Appl. No.: 09/893,128

(22) Filed: Jun. 27, 2001

(65) Prior Publication Data

US 2003/0002223 A1 Jan. 2, 2003

(51) Int. Cl.[7] .................................................. G11B 5/55
(52) U.S. Cl. ...................................................... 360/265.1
(58) Field of Search ........................... 360/265.1, 265.2; 310/12, 13

(56) References Cited

U.S. PATENT DOCUMENTS

| | | | |
|---|---|---|---|
| 5,402,290 A | 3/1995 | Daniel | |
| 5,455,726 A | * 10/1995 | Liu | 360/265.1 |
| 5,764,436 A | 6/1998 | Ngo et al. | |
| 5,864,447 A | * 1/1999 | Matsumoto et al. | 360/265.1 |
| 5,864,449 A | 1/1999 | Dominguez, Jr. et al. | |
| 5,875,073 A | 2/1999 | Andrews et al. | |
| 5,905,606 A | 5/1999 | Johnson et al. | |
| 5,973,888 A | * 10/1999 | Chawanya et al. | 360/265.1 |
| 6,011,672 A | * 1/2000 | Matsumoto | 360/265.1 |
| 6,115,222 A | 9/2000 | Andrews et al. | |
| 6,125,017 A | 9/2000 | Misso et al. | |
| 6,324,034 B1 | * 11/2001 | Misso et al. | 360/265.1 |

* cited by examiner

Primary Examiner—Robert S. Tupper
(74) Attorney, Agent, or Firm—Derek J. Berger

(57) ABSTRACT

An actuator stop for a disc drive having a compliant suspension member joining a rigidly supported stop pin and a noncompliant contact member. The contact member is characterized by a relatively greater compressive yield strength than that of the suspension member so that in response to an abutting engagement with the actuator. The contact member is displaceable relative to the stop pin in relation to the deflection characteristics of the suspension member.

27 Claims, 9 Drawing Sheets

ACTUATOR STOP

FIELD OF THE INVENTION

This invention relates generally to the field of disc drive data storage devices, and more particularly but not by way of limitation, to actuator stops for limiting the movement of the actuator in a disc drive.

BACKGROUND OF THE INVENTION

Modern disc drives are commonly used in a multitude of computer environments to store large amounts of data in a form that is readily available to a user. Generally, a disc drive has a magnetic disc, or two or more stacked magnetic discs, that are rotated by a motor at a high speed. Each disc has a data storage surface divided into a series of generally concentric data tracks where data is stored in the form of magnetic flux transitions.

A data transfer member such as a magnetic transducer is moved by an actuator to selected positions adjacent the data storage surface to sense the magnetic flux transitions in reading data from the disc, and to transmit electrical signals to induce the magnetic flux transitions in writing data to the disc. The active elements of the data transfer member are supported by flex structures extending from the actuator. The active elements are maintained a small distance above the data storage surface upon an air bearing sustained by air currents caused by the spinning discs.

A continuing trend in the industry is toward ever-increasing data storage capacity and processing speed while maintaining or reducing the physical size of the disc drive. Consequently, the data transfer member and supporting structures are continually being miniaturized, while data storage densities are continually being increased. The result is an overall increased sensitivity to vibration and shock. Increased data storage capacity has also decreased the allocation of non-data storage space on the discs, resulting in minimal space for actuator landing zones. Increased processing speed also requires increased actuator acceleration and deceleration in moving the read/write head from one track to another.

These demands require fundamentally tighter control of the actuator movement so as to better control the data transfer member travel along the data storage surface. Typically, the desired limit of inward travel is the landing zone where the data transfer member is parked during disc drive shut down. Travel beyond the landing zone can cause the data transfer member to strike the motor. Conversely, the desired limit of outward travel is an overshoot cushion zone beyond the outermost data track. Travel beyond the cushion zone can cause the data transfer member to move beyond the sustaining air bearing of the spinning discs.

Actuator stops are commonly employed to limit the actuator rotational movement in order to limit the data transfer member travel. It is common to use a pair of actuator stops, an inner stop limiting inward travel and an outer stop limiting outward travel. Although there are different types of actuator stops in use, generally all are associated with an abutting engagement of the advancing actuator to positively stop the movement thereof.

It is important that the actuator stop decelerate the actuator quickly and in a short distance, but without damaging the data transfer member. For example, the impact response imparted by the actuator stop to the actuator must transfer a deceleration force that is less than a threshold force that would cause a transducer to deflect away from the flexure and thereby either contact the data storage surface or plastically deform the flexure.

Rigidly supported stop pins provide an impact response resulting in a relatively minimal stopping distance, but typically at the expense of unacceptably high deceleration forces. Cantilevered stop pins reduce the peak deceleration force but can be unpredictable, due to relatively low accuracy from warpage, and can be susceptible to imparting ringing in the actuator.

It has been found that by fashioning an actuator stop by joining a noncompliant contact member to a rigidly fixed stop pin with a compliant member therebetween, a low cost actuator stop approximating the performance of a rigid stop pin but imparting acceptable peak deceleration forces can be provided. It is this invention which is discussed hereinbelow.

SUMMARY OF INVENTION

In one embodiment of the present invention, an actuator stop is provided for limiting travel of a disc drive actuator. The actuator stop includes a rigid stop pin and a bumper supported by the stop pin. The bumper comprises a compliant suspension member connected to the stop pin and supporting a noncompliant contact member. The contact member has a relatively greater compressive yield strength than that of the suspension member, so that in response to an abutting engagement with the actuator, the contact member is displaceable relative to the stop pin.

Additional features and benefits will become apparent upon a review of the attached figures and the accompanying description.

DETAILED DESCRIPTION OF THE PREFERRED EMBODIMENTS

Figure 1:
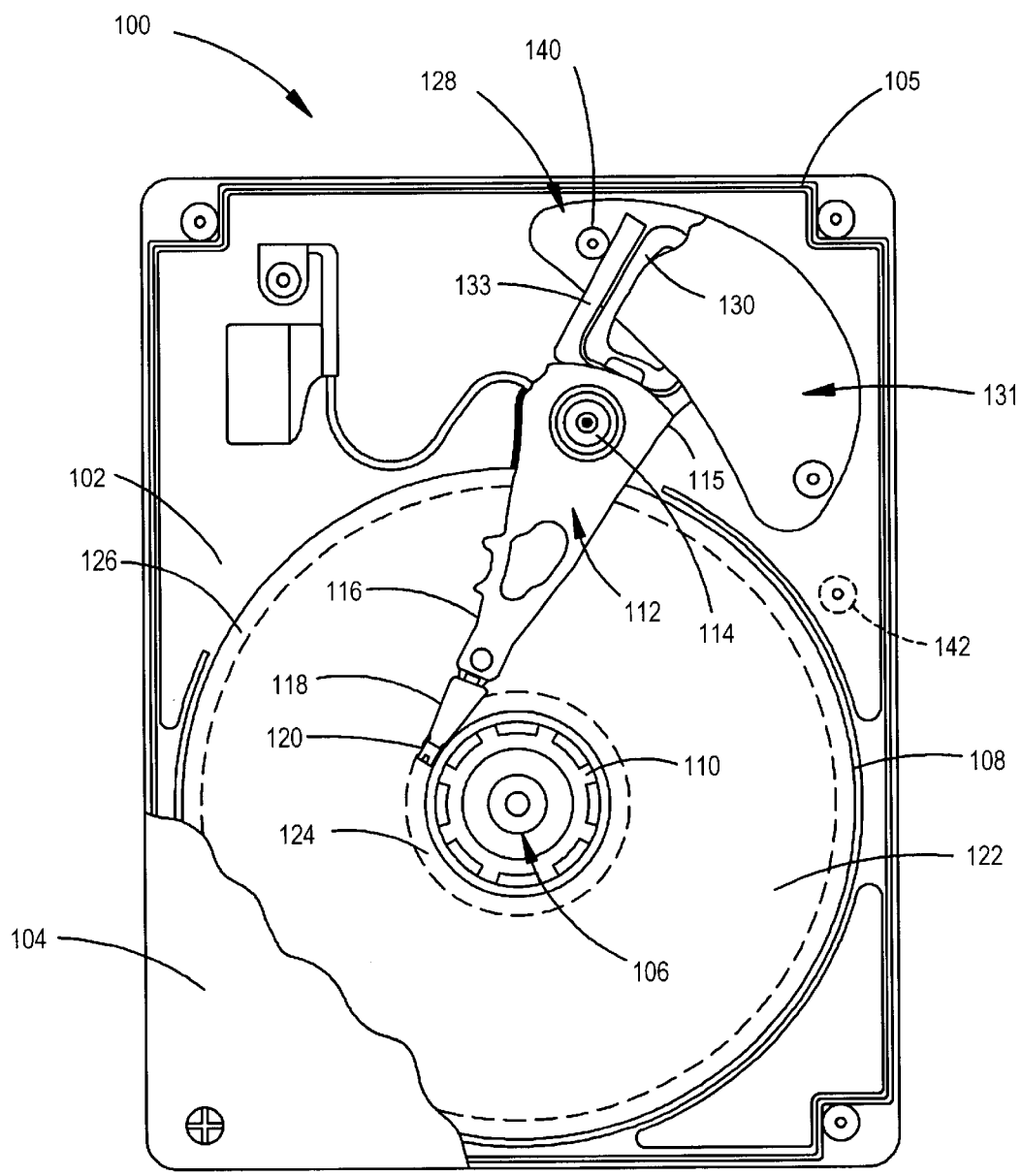
FIG. 1 is a diagrammatic plan representation of a disc drive constructed in accordance with an embodiment of the present invention, wherein a portion of the magnet assembly is partially cut away to reveal the actuator stop of the present invention.

Referring to the drawings in general, and more particularly to FIG. 1, shown therein is a plan representation of a disc drive 100 constructed in accordance with the present invention. The disc drive 100 includes a base deck 102 to which various disc drive components are mounted, and a cover 104 (partially cut-away) which together with the base deck 102 and a perimeter gasket 105 form an enclosure providing a sealed internal environment for the disc drive 100. Numerous details of construction are not included in the following description because they are well known to a skilled artisan and are unnecessary for an understanding of the present invention.

Mounted to the base deck 102 is a spindle motor 106 to which a plurality of discs 108 are stacked and secured by a clamp ring 110 for rotation at a high speed. Adjacent discs are typically separated by disc spacers (not shown). An actuator 112 pivots around a pivot bearing 114 in a plane parallel to the discs 108. The actuator 112 includes an actuator body 115 that is supported by the pivot bearing 114. The actuator body 115 has actuator arms 116 (only one shown) that support load arms 118 in travel across the discs 108 as the actuator arms 116 move within the spaces between adjacent discs 108. The load arms 118 are flex members that support data transfer members, such as read/write heads 120, with each of the read/write heads 120 adjacent a surface of one of the discs 108 and maintained in a data reading and writing spatial relationship by a slider (not shown) which operably supports the read/write head 120 on an air bearing sustained by air currents generated by the spinning discs 108.

Each of the discs 108 has a data storage region comprising a data recording surface 122 divided into concentric circular data tracks (not shown). Each of the read/write heads 120 is positioned adjacent a respective desired data track to read data from or write data to the data track. The data recording surface 122 is bounded inwardly by a circular landing zone 124 where the read/write heads 120 can come to rest against the respective discs 108 at times when the discs 108 are not spinning. The data recording surface 122 is similarly bounded outwardly by an overshoot cushion zone 126 beyond the outermost data track.

The actuator body 115 is pivotally positioned by a voice coil motor (VCM) 128 comprising an electrical coil 130 and a magnetic circuit source such as a magnet assembly 131. The magnet assembly 131 conventionally comprises one or more magnets supported by magnetic poles to complete the magnetic circuit. The top pole in FIG. 1 is partially cut away to reveal a portion of the actuator 112 at a proximal end of the actuator body 115. The coil 130 is attached to the proximal end of the actuator body 115, such as by molding the coil 130 to a yoke 133 portion of the actuator 112.

When controlled current is passed through the actuator coil 130, an electromagnetic field is set up which interacts with the magnetic circuit of the magnet assembly 131 to cause the actuator coil 130 to move. As the actuator coil 130 moves, the actuator body 115 pivots around the pivot bearing 114, causing the read/write heads 120 to travel across the discs 108.

The actuator 112 is shown in FIG. 1 having positioned the read/write head 120 in the landing zone 124. Further inward travel of the read/write head 120 is prevented by an abutting engagement of the yoke 133 of the actuator 112 against an actuator stop 140. Conversely, the actuator 112 abuttingly engages another actuator stop 142 (shown in hidden lines) when the read/write heads 120 are positioned in the overshoot cushion zone 126, the desired limit of outward travel.

Figure 2:
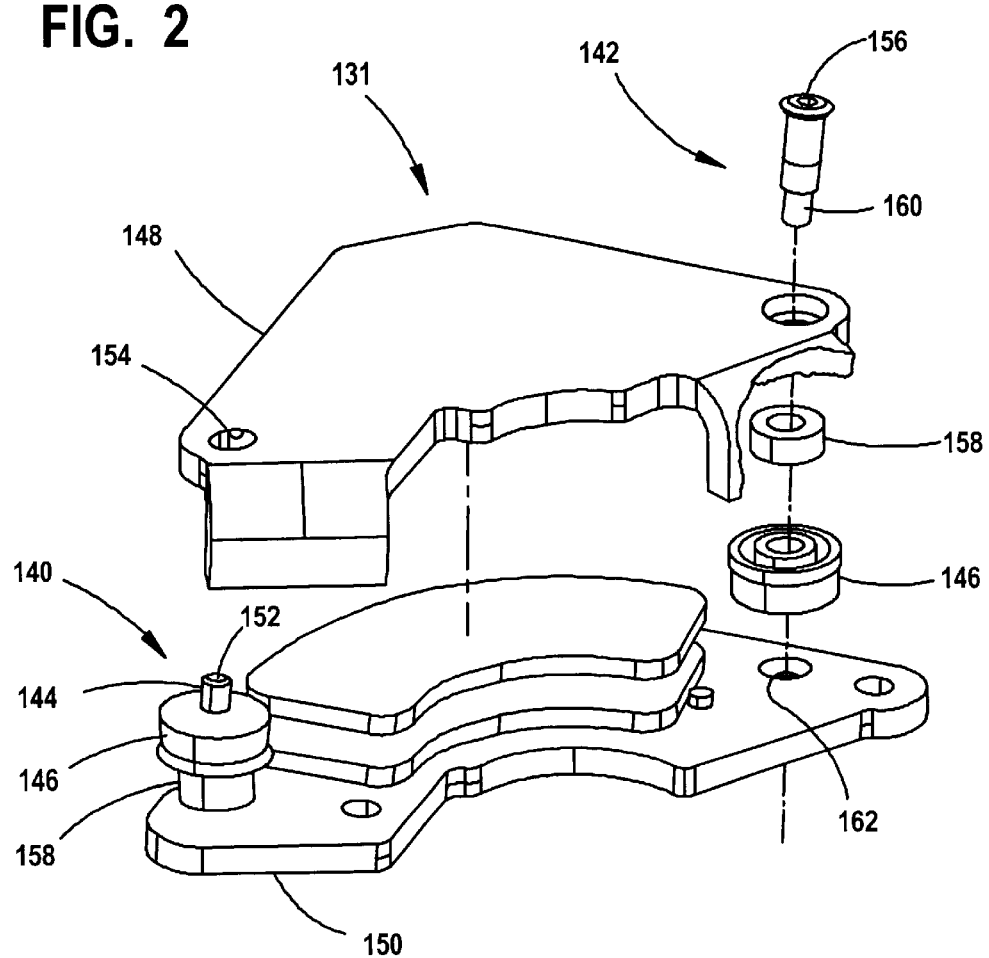
FIG. 2 is a partially exploded isometric representation of the magnet assembly and actuator stops of the disc drive of FIG. 1.

FIG. 2 is an exploded isometric representation of the magnet assembly 131 providing the magnetic circuit in which the coil 130 is engageable to move the actuator 112 to selected positions. Generally, the actuator stop 140 comprises a stop pin 144 which supports a bumper 146. In a first embodiment illustrated here, the stop pin 144 is preferably rigidly supported at both ends, thereby approximating the impact response characteristics of a rigid stop pin. In FIG. 2, for example, the magnet assembly 131 has an upper pole 148 and a lower pole 150 that support the respective ends of the stop pin 144. The stop pin 144 can furthermore serve as a fastening member for attaching the poles 148, 150 together in a spatially parallel relation. In FIG. 2, for example, the stop pin 144 clearingly passes through the pole 150 and has a threaded end 152 that threadingly engages an aperture 154 in the opposing pole 148. The other actuator stop 142 is shown in exploded detail in FIG. 2, comprising a stop pin 156 and another bumper 146.

In one convenient assembly method, the stop pins 144, 156 are passed through the poles 148, 150 and the bumpers 146 are pressingly disposed around the respective stop pins 144, 156 to retain the stop pins 144, 156 substantially transverse to the poles 148, 150. Spacers 158 can be used to align the bumpers 146 with the path of actuator travel. The poles 148, 150 can then easily be aligned and the stop pins 144, 156 acted on in order to join the poles 148, 150.

Figure 3:
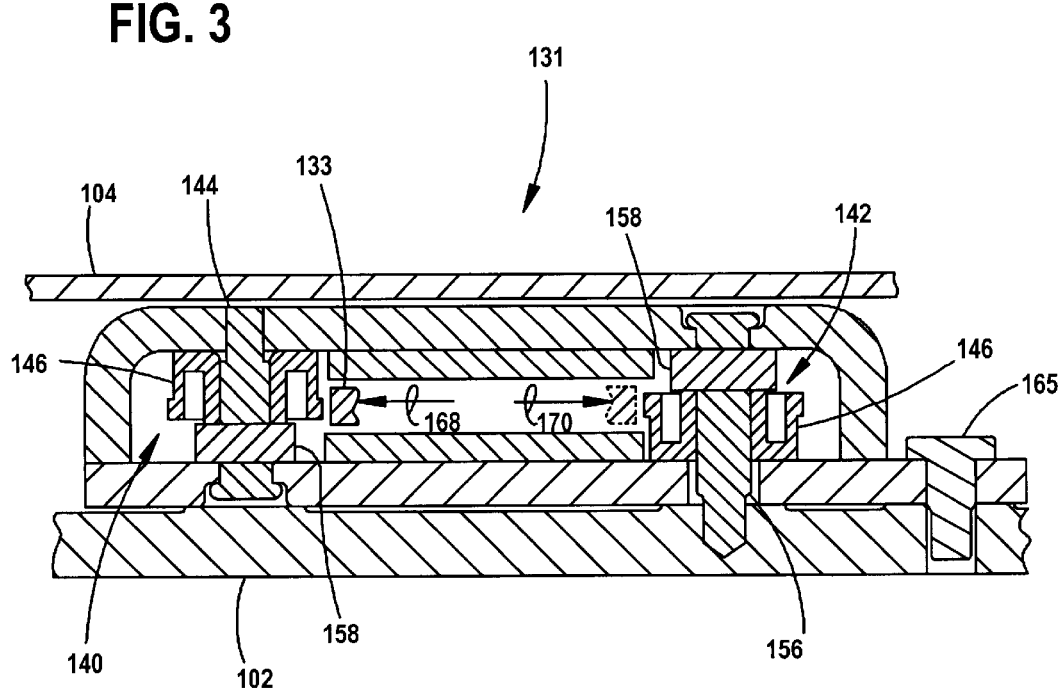
FIG. 3 is a diagrammatic cross-sectional representation of the magnet assembly of FIG. 1 illustrating the pivotal movement of the actuator relative to the actuator stops.

In addition to joining the poles 148, 150 together, the stop pins 144, 156 can furthermore serve as fastener members for attaching the magnet assembly 131 to the disc drive enclosure. As seen in FIGS. 2 and 3, for example, the stop pin 156 can comprise a threaded end 160 that clearingly passes through an aperture 162 in the pole 150 and threadingly engages the base deck 102. Additional fasteners such as a fastener 165 can be used to secure and/or locate the magnet assembly 131.

FIG. 3 illustrates the pivotal movement of the actuator 112 relative to the actuator stops 140, 142 of the first embodiment. The yoke 133 of the actuator 112 approaches the actuator stop 140 in direction 168 as the data transfer member (read/write head 120) approaches the inner travel limit. The opposing movement of the actuator 112 is shown in broken lines, wherein the yoke 133 approaches the actuator stop 142 in direction 170 as the data transfer member (read/write head 120) approaches the outer travel limit. In both cases, the bumper 146 abuttingly engages the actuator 112 preventing further movement of the actuator 112 in a direction when the data transfer member travels substantially to a desired boundary of the data storage surface 122.

Figure 4:
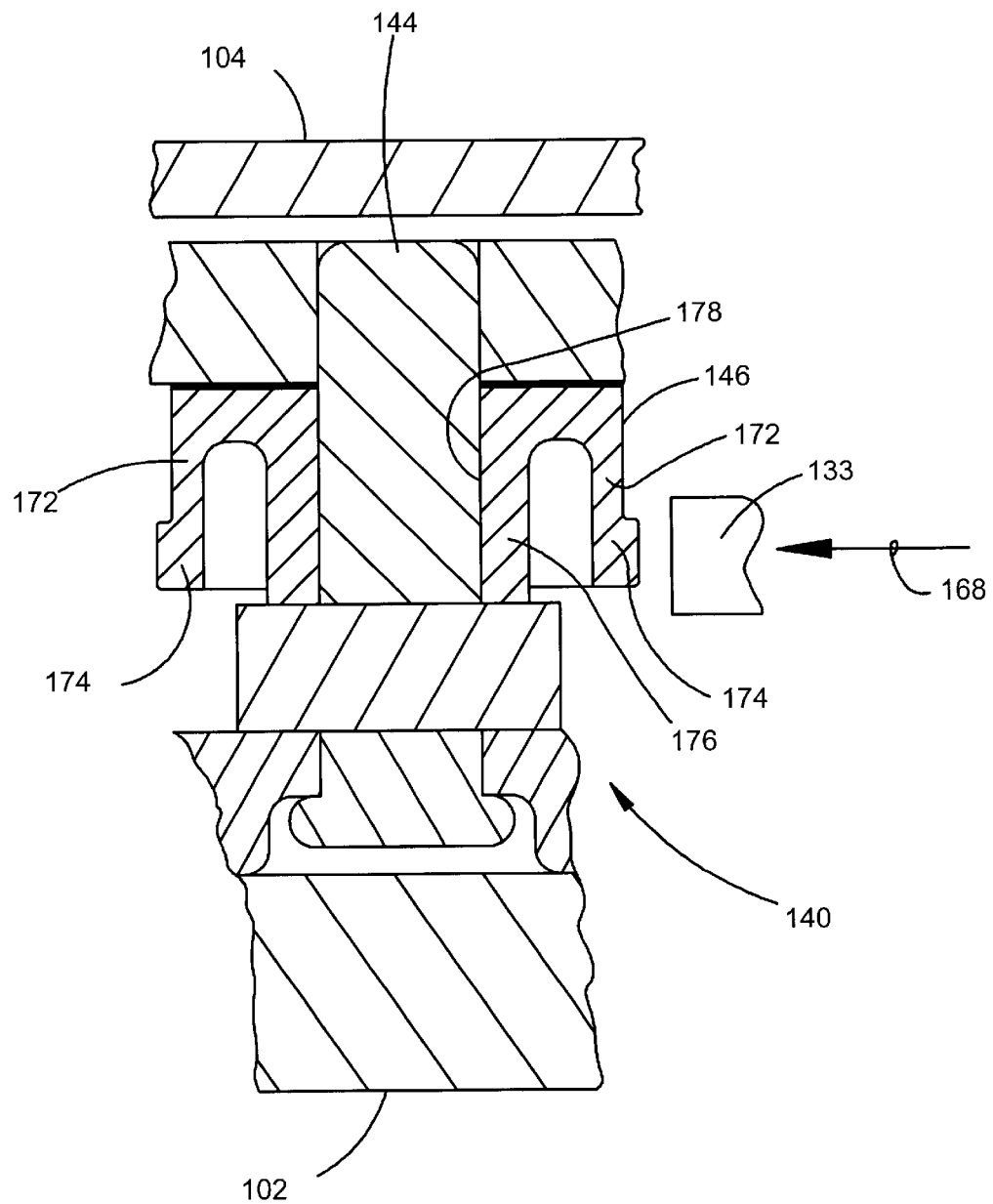
FIG. 4 is an enlarged detail of one of the actuator stops of FIG. 1 at a time when the actuator and the bumper are nonengaged.

Turning now to focus on the actuator stop 140, 142, FIG. 4 is an enlarged detail representation of the actuator stop 140 of FIG. 3. The stop pin 144 and the bumper 146 can be constructed of a number of substantially rigid materials such as, but not limited to, polymeric, metal, and composite materials. Preferably, the polymeric material is one with a characteristic high strength to modulus ratio, and with a characteristic constant performance throughout the range of expected environmental operating temperatures. Polymeric materials well-suited for use in the present invention include, for example, polyetherimide, such as Ultem® made by General Electric, and polyphenylsulfone, such as Radel R® made by BP Amoco.

The bumper 146 generally comprises a compliant suspension member 172 fixed at a proximal end thereof to the stop pin 144 and extending distally therefrom. The bumper 146 further comprises a contact member 174 supported by the suspension member 172 in the path of the yoke 133.

The actuator stop 140 in FIG. 4 comprises a characteristic integral construction. "Integral construction" means the actuator stop 140 is characterized by a manufacture such that a component part is formed by the joinder of two or more parts to function as a composite unit. Namely, this means the bumper 146 is joined to the stop pin 144. In one embodiment shown in FIG. 4 the suspension member 172 of the bumper 146 comprises a sleeve 176 defining a longitudinal passage 178 receivingly engaging the stop pin 144. Alternatively, for example, the bumper 146 can be overmolded to the stop pin 144.

Figure 5:
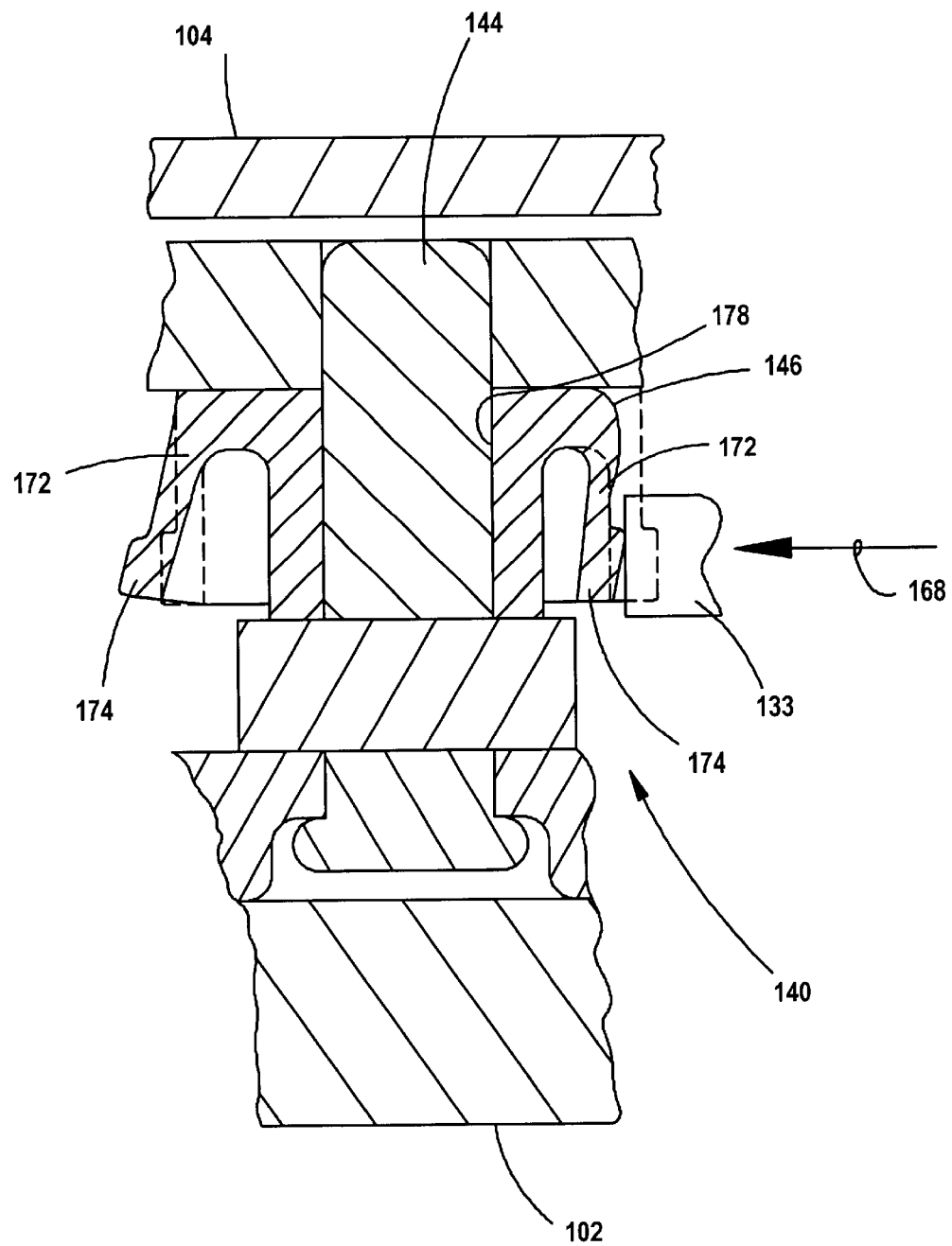
FIG. 5 is an enlarged detail similar to FIG. 4, but at a subsequent time when the actuator and the bumper are engaged.

The contact member 174 is effectively displaceable in relation to the rigid stop pin 144 in accordance with the deflection characteristics of the suspension member 172. In FIG. 4, for example, the contact member 174 comprises an annular member substantially concentrically disposed around the stop pin 144 when the yoke 133 (of the actuator 112) and the contact member 174 are nonengaged. Alternatively, as shown in FIG. 5, the contact member 174 comprises an annular member substantially nonconcentrically disposed around the stop pin 144 when the yoke 133 and the contact member 174 are engaged. Note that the nonengagement disposition of the contact member 174 is shown in broken lines in FIG. 5. During the abutting engagement, as shown in the solid lines in FIG. 5, kinetic energy is dissipated to decelerate the actuator 112 in accordance with a characteristic impact response provided by the compliant suspension member 172 of the bumper 146. The desired impact response can be achieved by selectively specifying material characteristics and physical arrangements to the suspension member 172. Ideally, the impact response is matched with the expected velocity of the actuator 112 so that the contact member 174 is displaced through a single excursion from the nonengaged concentric disposition to a maximum engaged nonconcentric disposition, such as in FIG. 5, in decelerating the actuator 112 to a stop.

Regardless of the selected impact response characteristics, generally the contact member 174 is characterized by a relatively greater compressive yield strength than that of the compliant suspension member 172, so that in response to the abutting engagement with the actuator 112 the suspension member 172 yields to permit the contact member 174 to displace substantially without yielding.

One way of providing the contacting member 174 with a relatively greater compressive yield strength is to provide a relatively greater cross sectional area to the contact member 174. In FIGS. 4 and 5, for example, the contact member 174 is stiffened by forming an annular rim portion of relatively greater cross sectional thickness in comparison to the suspension member 172.

Figure 6:
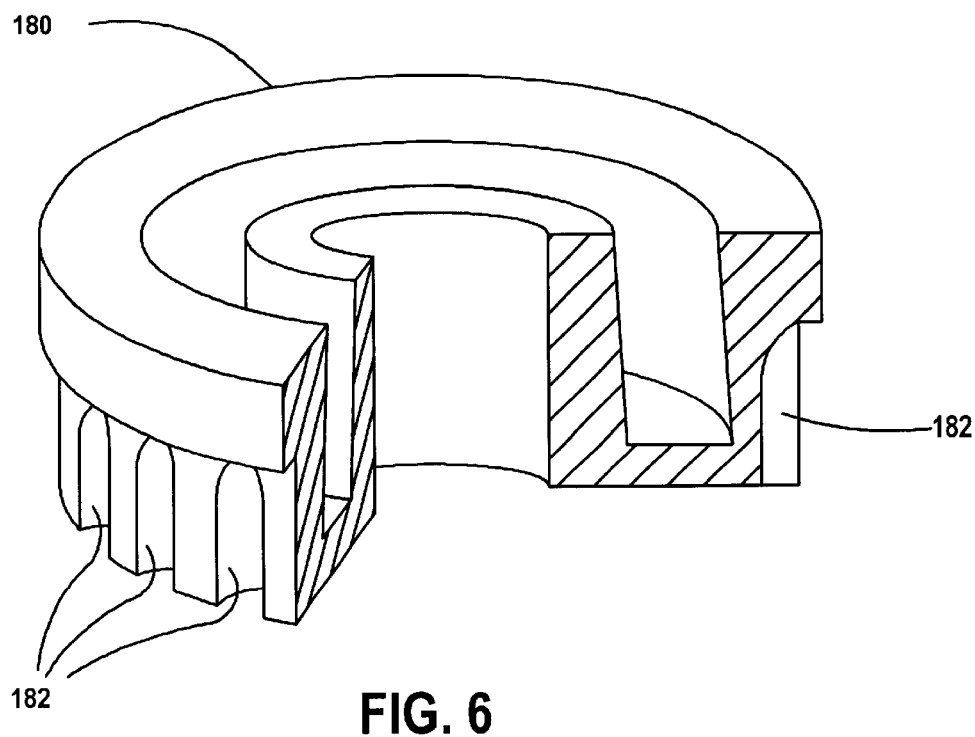
FIG. 6 is a cutaway isometric representation of a bumper constructed in accordance with an embodiment of the present invention.
Figure 7:
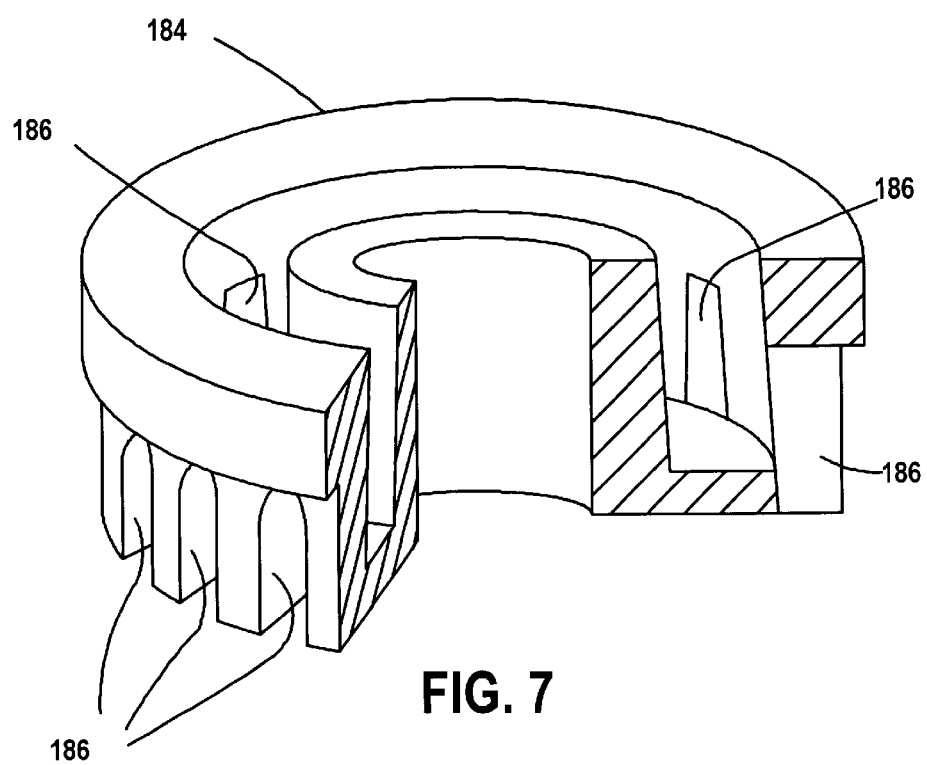
FIG. 7 is a cutaway isometric view of a bumper constructed in accordance with another embodiment of the present invention.

An alternative manner of providing the suspension member 172 with a relatively lesser compressive yield strength is to fashion one or more detent surfaces to decrease the cross sectional thickness. FIG. 6, for example, illustrates an alternative bumper 180 comprising a plurality of detents 182 reducing the cross sectional thickness of the suspension member 172. FIG. 7 illustrates an alternative bumper 184 comprising a plurality of detents 186 extending radially and forming openings through the suspension member 172. In both FIGS. 6 and 7 the detents 182, 186 comprise longitudinally extending slots that are substantially equidistantly arranged.

Figure 8:
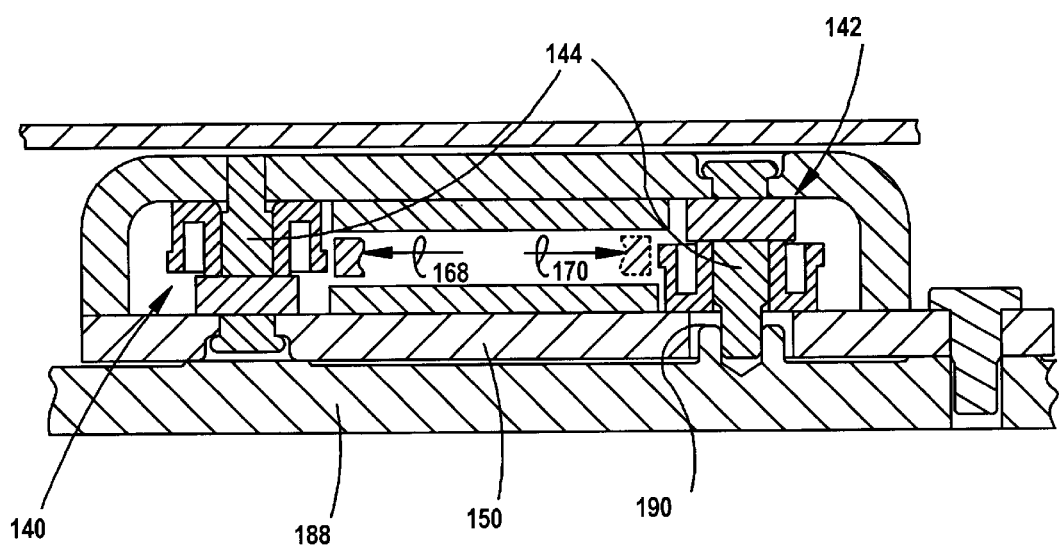
FIG. 8 is a diagrammatic cross-sectional representation similar to FIG. 3 but constructed in accordance with an alternative embodiment wherein the actuator stops comprise a common stop pin.

Furthermore, FIG. 8 is a diagrammatic cross-sectional representation similar to FIG. 3 but showing the disc drive enclosure comprising a modified base deck 188 with a boss 190 extending therefrom. By extending the attaching portion of the enclosure upward into a cavity in the pole 150, the stop pin 144 can be commonly used in both actuator stops 140, 142.

Figure 9:
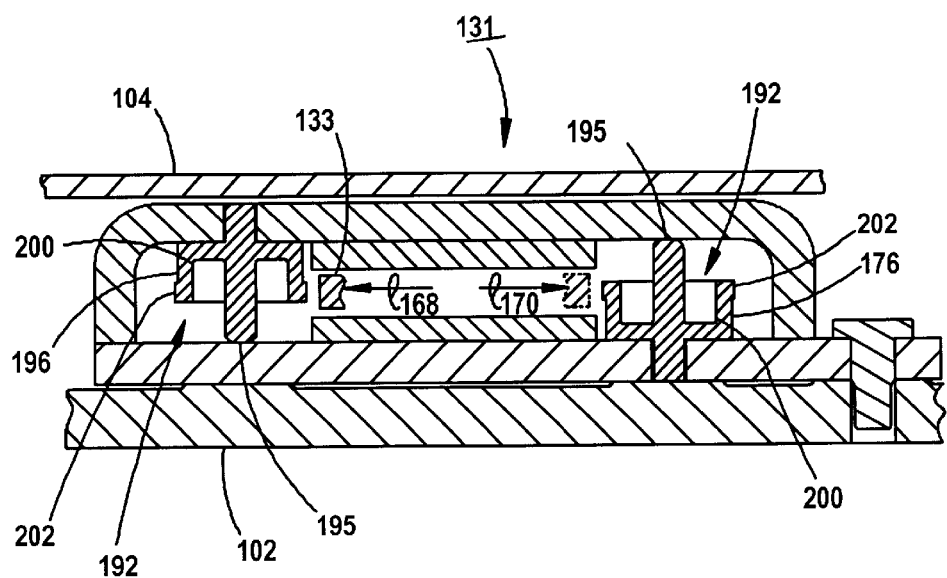
FIG. 9 is a diagrammatic cross-sectional representation similar to FIG. 3 showing actuator stops which comprise a characteristic unitary construction in accordance with another embodiment of the present invention.

FIG. 9 is a diagrammatic cross sectional representation of the magnet assembly 131 showing a pair of actuator stops 192 constructed in accordance with an alternative embodiment of the present invention. The actuator stop 192 of FIGS. 9–11 comprise a characteristic unitary construction. "Unitary construction" means the actuator stop 192 is characterized by unity, being undivided and whole. Namely, this means a stop pin 194 and a bumper 196 are manufactured as a continuous, single-part component. The unitary construction addresses some manufacturability concerns associated with minimizing part count and assembly procedure complexity.

Figure 10:
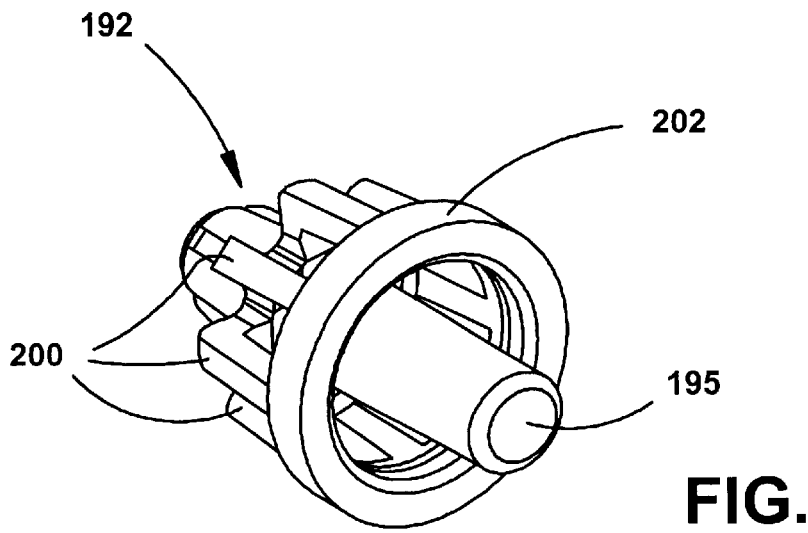
FIGS. 10 and 11 are isometric representations of the actuator stop of FIG. 9.
Figure 11:
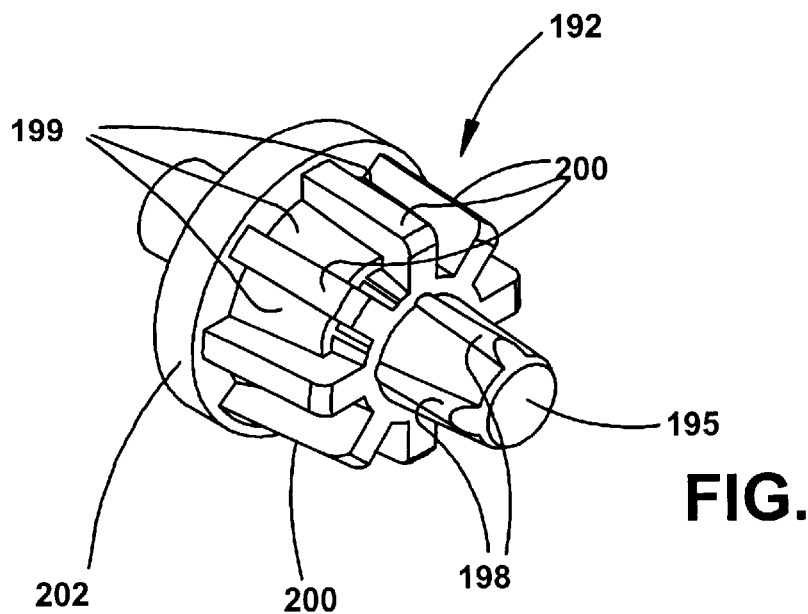

FIGS. 10 and 11 are isometric representations of the actuator stop 192. Note that the stop pin 194 can comprise a number of ribs 198 at one end extending outwardly to provide an interference fit with a receiving aperture in one of the pole plates 128. A second end 195 of the stop pin 194 is designed to abut an opposed pole plate 128. This embodiment is quite effective in dissipating kinetic energy from the actuator 133. This is because not only do compliant suspension member 200 and contact member 202 deflect when the stop 192 is contacted by the actuator 133, but free end 195 of the stop 192 is also permitted to deflect. The suspension member 200 functions effectively as a number of spokes, with slotted openings 199 therebetween, connecting the stop pin 194 and the contact member 202.

Alternatively characterized, a first contemplated embodiment of the invention is an actuator stop 140 for use in a disc drive 100 having an actuator 112 movably mounted in an enclosure 102, 104. The stop 140, 192 includes a stop pin 144, 194 having an end configured to be fixed within the enclosure 102, 104 and a bumper 146, 196. The bumper 146, 196 further includes a compliant suspension member 172, 200 fixed to and extending outwardly from the stop pin 144, 194, as well as a contact member 174, 202 supported by and less compliant than the compliant suspension member 172, 200. The contact member 174, 202 is configured to be contacted by the actuator 112. Optionally, the suspension member 172, 200 may include a sleeve which receives the stop pin 144, 194. As a further option, the contact member 174, 202 may include an annular member disposed around the stop pin 144, 194. This annular contact member 174, 202 may be arranged so as to be disposed substantially concentrically about the stop pin 144, 194 when the actuator 112 and the contact member 174, 202 are not in contact. As another option, the contact member 174, 202 may have a relatively greater compressive yield strength than that of the suspension member 172, 200, such that the contact member 174, 202 is configured to be moved so as to be nonconcentrically disposed around the stop pin 144, 194 when the actuator 112 is moved into contact with the contact member 174, 202. As yet another option, the annular contact member 174, 202 may be arranged so as to be disposed nonconcentrically about the stop pin 144, 194 when the actuator 116 and the contact member 174, 202 are in contact. As a further option, the suspension member 172, 200 may include at least one detent 182, 199 which reduces a cross sectional thickness of the suspension member 172, 200 relative to other portions of the suspension member 172, 200. Optionally, each detent 182, 199 may extend radially and form an opening 186, 199 through the suspension member 172. Each opening 186, 199 may further take the form of a longitudinally extending slot and there may optionally be a plurality of such openings 186, 199. As yet another option, the detents 182, 199 may be positioned substantially equidistantly from one another about the suspension member 172, 200. The stop pin 144, 194 may optionally be formed from metals, composites, or polymerics, and the bumper 146, 196 may also be formed from metals, composites, or polymerics. The stop pin 144, 194 and bumper 146, 196 may optionally be formed of integral construction, or may be of unitary construction as a further option.

Alternatively characterized, a second contemplated embodiment of the invention is a disc drive 100 having an enclosure 102, 104, a disc 108 rotatably mounted within the enclosure 102, 104, an actuator 112 movably supported within the enclosure 102, 104 and an actuator stop 140, 192. The actuator stop 140, 192 further includes a stop pin 144, 194 having an end fixed within the enclosure 102, 104 and a bumper 146, 196. The bumper 146, 196 further includes a compliant suspension member 172, 200 fixed to and extending outwardly from the stop pin 144, 194 and a contact member 174, 202 supported by and less compliant than the compliant suspension member 172, 200. The contact member 174, 202 is arranged so as to be contacted by the actuator 112. Optionally, the disc drive 100 may also include an electrical coil 130 supported by the actuator 112 and a magnet assembly 131 providing a magnetic circuit for interacting with the electrical coil 130 to selectively position the actuator 112, the stop pin 144, 194 being supported by the magnet assembly 131. This magnet assembly 131 may further include a pair of magnetic pole members 128, and the stop pin 133, 194 may extend between and engage the pole members 128 so as to hold the pole members 128 in a spaced parallel relation. As a further option, the stop pin 144, 194 may engage the enclosure 102, 104 so as to attach the pole members 128 to the enclosure 102, 104. As yet a further option, the drive 100 may include a head 120 supported by the actuator 112 for reading and/or writing data from the disc 108, the bumper 146, 196 being engageable with the actuator 112 for preventing further movement of the actuator 112 in a direction when the head 120 travels substantially to a desired boundary on a data storage surface of the disc 108.

It is clear that the present invention is well adapted to attain the ends and advantages mentioned as well as those inherent therein. While a presently preferred embodiment of the invention has been described for purposes of the disclosure, it will be understood that numerous changes may be made in the construction, operation and arrangement of the various elements, steps and procedures without departing from the spirit and scope of the invention as defined in the following claims.

What is claimed is:

1. A stop for use with a device having an actuator movably mounted on a base, the stop comprising:
   a stop pin having one end configured to be fixed with respect to the base; and
   a bumper, comprising:
      a compliant suspension member fixed to the stop pin and extending outwardly therefrom; and
      a contact member supported by the compliant suspension member, the contact member being less compliant than the suspension member and configured to be contacted by the actuator.

2. The actuator stop of claim i, in which the suspension member comprises a sleeve receiving the stop pin.

3. The actuator stop of claim 1, in which the contact member comprises an annular member disposed around the stop pin.

4. The actuator stop of claim 3, in which the annular contact member is configured to be disposed substantially concentrically about the stop pin when the actuator and the contact member are not in contact.

5. The actuator stop of claim 3, in which the annular contact member is configured to be disposed nonconcentrically about the stop pin when the actuator and the contact member are in contact.

6. The actuator stop of claim 1, in which the suspension member comprises at least one detent reducing a cross sectional thickness of the suspension member relative to other portions of the suspension member.

7. The actuator stop of claim 6, in which each detent extends radially and forms an opening through the suspension member.

8. The actuator stop of claim 7, in which each opening comprises a longitudinally extending slot.

9. The actuator stop of claim 1, in which the stop pin comprises a material selected from a group consisting of metals, composites, and polymerics.

10. The actuator stop of claim 1 wherein the bumper comprises a material selected from a group consisting of metals, composites, and polymerics.

11. The actuator stop of claim 1 wherein the stop pin and bumper are formed from a single piece of material.

12. The stop of claim 1, in which the device comprises a data storage device.

13. The stop of claim 12, in which the data storage device comprises disc drive.

14. A data storage device comprising:
   a base;
   a storage medium;
   an actuator movably supported with respect to the base; and
   an actuator stop, comprising:
      a stop pin having an end fixed with respect to the base; and
      a bumper, comprising:
         a compliant suspension member fixed to the stop pin and extending outwardly therefrom; and
         a contact member supported by the compliant suspension member, the contact member being less compliant than the suspension member and configured to be contacted by the actuator.

15. The data storage device of claim 14, further comprising:
   an electrical coil supported by the actuator; and
   a magnet assembly providing a magnetic circuit for interacting with the electrical coil to selectively position the actuator, the stop pin being supported by the magnet assembly.

16. The data storage device of claim 15, the magnet assembly further comprising:
   a pair of magnetic pole members, the stop pin extending between and engaging the pole members so as to hold the pole members in a spaced parallel relation.

17. The data storage device of claim 16, the magnet assembly further comprising:
   a pair of magnetic pole members, the stop pin engaging the enclosure so as to attach the pole members to the enclosure.

18. The data storage device of claim 14, further comprising:
   a head supported by the actuator for reading and/or writing data from the disc, the bumper being engageable with the actuator for preventing further movement of the actuator in a direction when the head travels substantially to a desired boundary on a data storage surface of the disc.

19. The data storage device of claim 15, in which two ends of the stop pin are fixed to the magnet assembly.

20. The data storage device of claim 15, in which only one end of the stop pin is fixed to the magnet assembly.

21. The data storage device of claim 14, in which the storage medium comprises a rotating disc.

22. A data storage device, comprising:

a movable actuator for accessing data; and means for limiting travel of the actuator.

23. The data storage device of claim 22, the limiting means further comprising:

a fixed stop pin.

24. The data storage device of claim 22, the limiting means further comprising:

a noncompliant contact member for contacting the actuator at a limit of actuator travel.

25. The data storage device of claim 22, the limiting means further comprising:

a compliant member for dissipating kinetic energy of the actuator at a limit of actuator travel.

26. The data storage device of claim 22, further comprising:

a magnet assembly for selectively positioning the actuator, the limiting means being supported by the magnet assembly.

27. The data storage device of claim 22, the data storage device comprising a disc drive.

* * * * *